United States Patent [19]

Mumola et al.

[11] 4,422,046

[45] Dec. 20, 1983

[54] AXISYMMETRIC SPATIAL/TEMPORAL ENCODER

[75] Inventors: Peter B. Mumola, Huntington; Paul R. Yoder, Jr., Wilton; Raul E. Casas, Danbury; William M. Grossman, Ridgefield, all of Conn.

[73] Assignee: The Perkin-Elmer Corporation, Norwalk, Conn.

[21] Appl. No.: 162,213

[22] Filed: Jun. 23, 1980

[51] Int. Cl.³ .............................................. H01S 3/05
[52] U.S. Cl. ...................................... 330/4.3; 372/94; 350/453
[58] Field of Search ............. 330/4.3; 331/94 J, 94 C, 331/94 D; 356/350; 350/162 SF, 453, 445

[56] References Cited

U.S. PATENT DOCUMENTS

| 4,001,705 | 1/1977 | Sinclair et al. | 330/4.3 |
| 4,013,365 | 3/1977 | Vali et al. | 356/350 |
| 4,060,769 | 11/1977 | Mallozzi et al. | 330/4.3 |
| 4,156,852 | 5/1979 | Hogen | 330/4.3 |
| 4,229,106 | 10/1980 | Dorschner et al. | 356/350 |
| 4,243,942 | 1/1981 | Glass | 330/4.3 |
| 4,247,832 | 1/1981 | Sanders et al. | 356/350 |

FOREIGN PATENT DOCUMENTS 1384095  11/1964  France .................................. 356/350

Primary Examiner—Nelson Moskowitz
Attorney, Agent, or Firm—F. L. Masselle; E. T. Grimes; T. P. Murphy

[57] ABSTRACT

An encoder for providing a conical array of temporally phased pulse beams. A pulse is inserted and continuously recirculated around an optical ring. The pulse is amplified during each circulation and a portion of the pulse is emitted at the end of each circulation. The encoder includes means for spatially separating each emitted pulse to provide a conical array of beams at a constant field angle relative to the optical axis of propagation.

19 Claims, 3 Drawing Figures

AXISYMMETRIC SPATIAL/TEMPORAL ENCODER

BACKGROUND OF THE INVENTION

Laser fusion is a process by which a pellet of deuterium and tritium is heated by an intense beam of laser light to a temperature sufficiently high to initiate a fusion reaction. The temperature necessary to induce fusion is approximately 100,000,000° C. Achievement of such high temperatures for even minute fractions of a second requires laser beams of extremely high power.

It has been found that laser pulses of high power may be obtained with the use of rare gas halide excimer laser amplifiers. The problems with these amplifiers is that they lack storage capability. Efficient energy extraction from such amplifiers requires long pulse operation, e.g., of the order of 500 ns.

One method of obtaining efficient energy extraction from the laser amplifier is to cause it to see a temporally contiguous train of short pulses simulating a single long pulse. In an encoder, these pulses are spatially overlapping but temporally contiguous and angularly dispersed in such a way that they spatially separate after propagating some distance. The pulses are then amplified and recombined with suitable time delays to form a single high energy composite pulse.

Various techniques are presently known for temporally and spatially encoding light pulses.

One such technique utilizes a series of beamsplitters each tilted at a different angle but aligned so that a short pulse passes through each beamsplitter. The reflected beams, however, propagate in various directions. These pulses can be individually amplified. Next, the pulses can be temporally synchronized and combined into a single pulse through appropriate delay means. Such an encoding system has the disadvantages that each pulse undergoes substantial attenuation from the original pulse and optical aberrations caused by each beamsplitter are cumulative. In addition, such a system requires a beamsplitter and an amplifier for each pulse which is to form part of the desired composite pulse.

Another technique utilizes a sequence of optical components arranged in a slightly misaligned ring. A master pulse is typically introduced into the ring at a beamsplitter. The misalignment causes a series of pulses to leave the ring at a linearly increasing field angle. Such an arrangement provides temporal and spatial encoding to facilitate recombination of the exiting pulses into a high energy composite pulse. To compensate for energy loss at the exit, which is a beamsplitter, an amplifier may be incorporated into the ring. This is particularly essential where the device is to be used in laser fusion.

The problem with the second foregoing described device is that the increasing field angle complicates beam cleanup by spatial filtering. Defocus due to aberrations such as Petzval curvature and astigmatism becomes progressively worse. Also, in order to accommodate the progressively increasing field angle, lenses in the system must have "fast" relative apertures which causes significant spherical aberration. Other aberrations are also present, the correction of which complicates and increases the number of optical elements necessary in the system.

The present invention overcomes or substantially alleviates the above discussed problems by providing an encoder that spatially separates beams by generating a series of temporally phased laser pulses as an evenly spaced conical array of pulsed beams at a constant field angle.

SUMMARY OF THE INVENTION

The present invention is an optical encoder. It comprises an optical ring for recirculating a parent pulse through the optical circuit wherein each pulse is time delayed from the preceding pulse by the time it takes to make the optical circuit. A beamsplitter is the entrance-exit element of the encoder. The optical ring may also include an amplifier for compensating for power extracted at the beamsplitter. The four corners of the optical circuit comprise the beamsplitter, a folding mirror, an out-of-plane mirror assembly and a roof mirror. The parent pulse enters the circuit through the beamsplitter at a slight angle which imparts a constant, non-zero field angle to each output pulse. The out-of-plane mirror rotates each succeeding pulse a predetermined amount. The roof mirror then inverts the pulse prior to its passing through the amplifier and exiting through the beamsplitter. Apart from the encoder, appropriate delay means may be disposed subsequent to the exit for combining the temporally and spatially exiting pulses into a single high energy pulse. Efficient use of the amplifier is obtained by choosing pulse width and encoder circumference such that pulse circulation time is equal to pulse width.

Other objects and advantages of the subject invention will become apparent by reference to specification and drawings which follow.

DESCRIPTION

Figure 1:
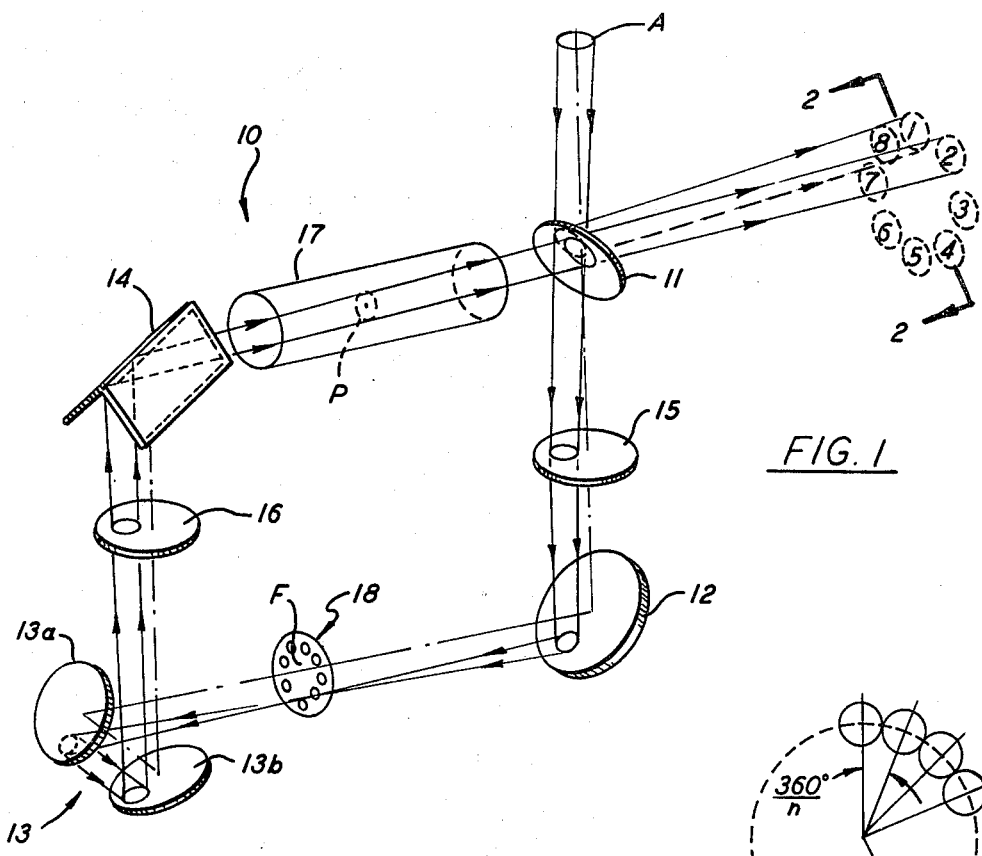
FIG. 1 illustrates in schematic form a preferred embodiment of the encoder of the present invention.

Referring to FIG. 1 there is shown the ring encoder 10 of the present invention. The four corners of ring encoder 10 comprises a beamsplitter 11, a folding mirror 12, an out-of-plane mirror assembly 13 and a roof mirror 14. Except for mirror 13 (a) of the out-of-plane mirror assembly 13 all the mirror elements 11, 12, 13(b), and 14 are located in a single plane. All the elements 11-14 function generally to reflect radiation in a recirculating fashion about the four corners of the circuit defined by the mirror elements 11, 12, 13 and 14.

A beamsplitter is a mirror that reflects part of a beam of light and transmits part. In the present application, the word light includes all radiation capable of being reflected and not just the visible portion of the spectrum. In this example of a practical embodiment beamsplitter 11 is of the type which transmits essentially half of the incident light and reflects essentially half of the incident light. The transmittance of the beamsplitter 11 is a design variable which value will be chosen in general on the basis of the amplifier characteristics. Beamsplitter 11 functions in the present invention as an input-output device, i.e., it permits a portion of incident light to enter the ring encoder 10 and a portion of that light to exit the ring encoder 10 at the end of each circulation. Since the beamsplitter in this example transmits fifty percent of incident light the intensity of the light circulating within ring encoder 19 is diminished by half at each succeeding circulation. Similarly, half of the input incident light is accepted into the ring encoder 10 since half the incident light is initially reflected away from the ring encoder 10 by the beamsplitter 11.

The folding mirror 12 serves to change the light beam direction. The degree of direction change, of course, is dependent on the relative angular position of the mirror. In the present invention folding mirror 12 changes direction of the optical axis by ninety degrees. It is oriented, however, to direct a beam to mirror 13a of out-of-plane mirror assembly 13 which is disposed outside the plane defined by beamsplitter 11, folding mirror 12, mirror 13b and roof mirror 14.

The out-of-plane mirror assembly 13 comprises the two mirrors 13a and 13b above discussed. Mirror 13a is out of the plane described above. Mirror 13b is in that plane. A beam from folding mirror 12 is directed away from the defined plane and toward mirror 13a. Mirror 13a redirects the beam back into the plane to mirror 13b which directs the beam to roof mirror 14.

The out-of-plane mirror assembly 13 functions to rotate the beam in azimuth about the optical axis each time the beam completes a round trip through the encoder. The beam is rotated about the optical axis by an amount dependent on the out-of-plane and in plane distances by which mirror 13(a) is separated from mirror 12.

The roof mirror 14 comprises two mirror surfaces at right angles to one another. The line where the two mirror surfaces meet is called the dihedral edge. The roof mirror 14 directs the beam to the beamsplitter 11 which extracts a portion of beam energy and directs the remaining portion of the beam for another circulation around the ring encoder. The roof mirror 14 inverts the image of the beam to compensate for the inversion caused by the image forming lenses 15 and 16 of the system.

An objective lens 15 having an effective focal length equal to f is disposed between beamsplitter 11 and folding mirror 12. The lens 15 functions to focus incident collimated beams in the plane through a point F between folding mirror 12 and out-of-plane mirror 13. A collimating lens 16 is disposed between out-of-plane mirror 13 and roof mirror 14. The collimating lens 16 which is optically identical to lens 15 refocuses the circulating beam so that the beam arriving at beamsplitter 11 is collimated. The lenses 15 and 16 are located in positions to reimage the pupil P back on itself with unity magnification. The pupil P is located between the roof mirror 14 and beamsplitter 11. The axial distance around the ring encoder is chosen to be four times the focal length of lens 15 or 16. For a fixed ring distance, the above relationship defines the focal lengths and positions of the lenses 15 and 16.

The lenses 15 and 16 are each one focal length from the pupil P. Since this is so the pupil P is imaged on itself. In other words, the beams are forced to go through pupil P and remain in the ring. This also fixes the position of focal point or image plane F for any given distance of mirror 13a from the plane. The out-of-plane and in plane distances by which mirror 13 is separated from mirror 12 also determine the degree of rotation or the beam relative to the preceding beam.

Once a beam or pulse of light enters the ring encoder is continously recirculates losing a fraction of its intensity after each circulation. For this reason, a light amplifier 17 may be disposed between roof mirror 14 and beamsplitter 11 to compensate for the light lost at the beamsplitter 11 after each circulation.

An aperture A located one focal length in front of the lens 15 is used to determine diameter of the input beam. In addition, as will be described more fully below, the aperture A which is the external counterpart to internal pupil P is used to assure that the center of the beam passes through the center of pupil P. This is accomplished by causing the center of the beam to pass through the center of the aperture A. This is particularly important since the light beam or pulse enters the system at an angle $\delta$.

To this point has been described a ring encoder which generates an evenly spaced conical array of pulsed beams. Each beam that emerges from the system is at a constant angle $\delta$ off the optical axis of the ring encoder and each beam differs in azimuthal angle from its neighbors by $(360/n)$ degrees where n is the number of beams. This disposition of beams is seen at plane 2—2 in FIG. 1 and also in FIG. 2.

In order to obtain the constant, non zero field angle, the collimated input beam is made to enter the system at the angle $\delta$ with respect to the optical axis of the aligned ring encoder.

The out-of-plane mirror 13 turns each beam in azimuth about the optical axis by 360 deg/n with respect to the last beam.

Figure 2:
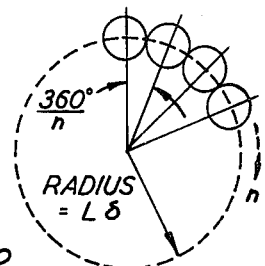
FIG. 2 which is a view of plane 2—2 represents an image of the conical array of pulsed beams at the plane.

FIG. 2 shows the conical array of beams as they would appear on a physical plane as they emanate from the telecentric pupil P. The radius or distance of the centers of the beams from the optical axis at the plane is given by L $\delta$ where L is the distance from the pupil P to plane 2—2 and $\delta$ is the angle of entry of the beam at aperture A. For a given beam diameter (determined by aperture A) the distance L may be chosen sufficiently long so that each beam in the array is physically separate. This is essential where the beams are to be recombined into a composite beam or pulse as will be discussed in more detail hereinbelow.

Without an amplifier 17 each beam exiting the system has only a fraction of the intensity of its preceding pulses. However, with an amplifier, each beam in the array can be of equal intensity. The gain of the amplifier may, if desired, be varied in time to alter the intensity of the outgoing pulses.

While the ring encoder performs its function of temporal and spatial encoding where the input beam is continuous, a practical embodiment utilizes a beam of short duration, i.e., a pulse.

Where the imput pulse is a laser pulse and the ring encoder is to be utilized in laser fusion, the amplifier 17 is a laser amplifier. For exmaple, the laser amplifier may be of the electron beam energized type utilizing KrF as the laser medium. Such an amplifier is known to the art and may be purchased, for example, from Maxwell Laboratories, San Diego, Calif., and is known as the Maximer Laser Amplifier.

In high energy laser systems the vicinity of focal plane F must be maintained at a high vacuum to prevent breakdown and plasma formation. The images are separate, and the beams do not overlap in the vicinity of the image plane. In this vicinity where the beams do not spatially overlap, a saturable absorber may be located as a means for selectively attenuating unwanted weak light which could otherwise leave the system as stray light.

A collimated parent pulse enters the system at an angle $\delta$ with respect to the optical axis of the aligned ring encoder. It enters through aperture A with its center passing through the center of the aperture A. A fraction of the pulse energy is reflected at beamsplitter 11 forming the first beam in the array. The rest of the pulse energy recirculates about the ring encoder 10. At each circulation, a beam is emitted from the ring encoder 10 via beamsplitter 11. Each emitted beam forms an element in the conical beam array. Each emitted beam is equal in intensity to the first beam by virtue of the restoring effect of the amplifier 17.

For rare gas halide excimer lasers to use the laser amplifier most efficiently, it is necessary for the amplifier to see the pulse train as a single long pulse. This is so since the laser amplifier has no storage capacity and energy is lost when a pulse is not present therein. To acomplish this objective the geometry of the system is chosen so that the pulse width equals the time it takes the pulse to complete one circulation of the ring encoder. In a practical embodiment the distance around the encoder is three meters making the desired pulse width 10 nsec. The length can be varied to increase or decrease the transit time of the pulses in general.

It has already been pointed out that the optics of the ring encoder cause the beams to stay within the ring and pass through the pupil on each circulation.

It should also be pointed out that spatial filter 18 may be used. Such a filter provides beam clean-up and improves imagery, reduces stray light and parasitic oscillations of the amplifier. Spatial filter 18 is a disc having n "pinholes" arranged in coplanar fashion in a ring of annular radius $\delta f$ so as to coincide with the aerial images formed by the encoder optics.

Figure 3:
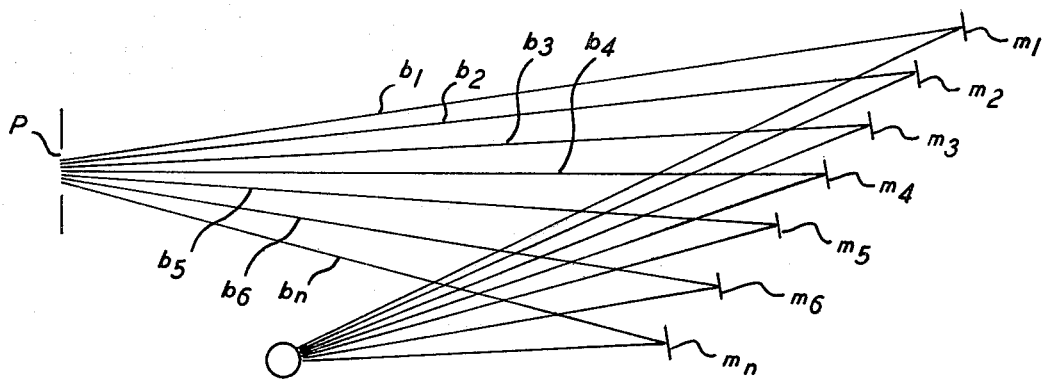
FIG. 3 illustrates a mirror system for recombining the pulsed beams into a composite pulse.

FIG. 3 is representative of an arrangement for taking the temporally and spatially encoded beams and recombining them into a single high energy composite pulse. Such an arrangement is particularly useful where the present invention is to be used in laser fusion but has general utility in any situation where it is desired to provide an amplified output of a light pulse.

Basically, the mirror system comprises a plurality of mirrors ml to mn equal in number to the number of beams bl to bn in an array. FIG. 3 shows only seven such mirrors and beams but it should be remembered the number is limited only by the diameter of the beam and the radius of the conical array.

Each mirror is placed at a distance from the pupil P so that each pulse is delayed in time an amount sufficient so that all reflected beams arrive simultaneously at the desired point to form the composite pulse. Thus, mirror ml which receives the first pulse is located furthest from pupil P with each succeeding mirror being located a distance equal to the distance of the preceding mirror from the beamsplitter minus the distance around the encoder. Each of the mirrors ml to mn is also arranged spatially in an array to receive its respective pulse.

The mirrors are tilted at angles so that all the beams are directed to a single point, e.g., pellet 19. Pellet 19 may be deuterium and tritium and the composite laser pulse would irradiate and compress the pellet causing a thermonuclear reaction.

The spatial and temporal encoding provided by the ring encoder of the present invention makes possible the above stacking or recombining of the pulses into a single high energy composite pulse. In laser fusion, this is extremely important.

In practice, a parent pulse is inserted in the system and permitted to make a sufficient number of circulations to make a full array of output pulses as opposed to permitting the pulse to recirculate indefinitely. This limitation on the number of pulses is easily accomplished by deenergizing the amplifier. If a rare gas halide excimer laser amplifier is used, it quickly loses gain and becomes an absorber when externally imposed excitation ceases.

The structural arrangement of the present invention is also useful to detect accurate alignment of an input beam. In such a case the goal of alignment is to have the angle equal to zero. Thus, when an on-axis beam is inserted into the system and a field angle other than zeo is present, then an output conical array with a non-zero field angle will be observed indicating misalignment is present. When no field angle is present then the beams in the array converse into a single precisely aligned output beam.

Other modifications of the present invention are possible in light of the above description which should not be construed as placing limitations of the invention other than those limitations set forth in the claims which follow:

We claim:

1. An optical ring for continuously circulating a beam around its periphery, comprising in combination;
    first means for receiving a collimated beam into said ring at a predetermined angle relative to the optical axis of the ring;
    second means comprising an out-of-plane mirror assembly for causing said beam to turn in azimuth about the optical axis.

2. An optical ring according to claim 1 wherein said first means comprises,
    a beamsplitter for transmitting out of the ring a portion of beam energy at the end of each circulation and reflecting a portion of beam energy for recirculation within the ring.

3. An optical ring according to claim 2 further comprising,
    first mirror means reflecting said beam to said second means.

4. An optical ring according to claim 2 further comprising,
    second mirror means for receiving said beam from said second means and directing it back to said beamsplitter.

5. An optical ring according to claim 4 wherein said first mirror means is a folding mirror.

6. An optical ring according to claim 5 wherein said second mirror means is a roof mirror.

7. An optical ring according to claim 6 wherein said beamsplitter, said folding mirror and said roof mirror define a plane.

8. An optical ring according to claim 7 wherein said out-of-plane mirror assembly comprises,
    a first mirror disposed out of the plane defined by said beamsplitter, said folding mirror and said roof mirror for receiving said beam from said folding mirror,
    a second mirror disposed for receiving said beam from said first mirror and directing it within said plane to said roof mirror.

9. An optical ring according to claim 8 further comprising,
    a first lens disposed between said beamsplitter and said folding mirror focusing said beam at a point between said first mirror of said out-of-plane mirror assembly and said folding mirror, a second lens disposed between said second mirror of said out-of-plane mirror assembly and said roof mirror for collimating said beam, said first and second lens being optically substantially identical.

10. An optical ring according to claim 9 wherein the distance around the ring is equal to four times the focal length of said first or second lens.

11. A optical ring according to claim 10 wherein said first means includes, an aperture disposed a distance from said first lens equal to the focal length of said first or second lens and such that the center of said beam passes through the center of said aperture.

12. An optical ring according to claim 11 further including, a spatial filter disposed at the focal plane of said first lens having a series of apertures disposed at a constant radial distance from the optical axis to coincide with the plurality of images formed by the optical ring.

13. An optical ring according to claim 12 further including, an amplifier disposed between said roof mirror and said beamsplitter for restoring the energy of said beam lost at said beamsplitter.

14. An optical ring according to claim 13 wherein said beam is a pulse having a time duration substantially equal to the time for it to make one circulation around the optical ring.

15. An optical ring according to claim 14 wherein said beam is a laser pulse and said amplifier is a laser amplifier.

16. An optical ring according to claim 15 further including, a saturable absorber disposed in the vicinity of said spatial filter for selectively attenuating unwanted stray light.

17. An optical ring according to claims 9, 10, 11, 12, 13, 14, 17 or 16 further including, delay means disposed to receive each of said recirculated beams and form a composite beam thereof, said delay means including means for directing said composite pulse at a single point.

18. An apparatus for spatially and temporally encoding a radiation pulse comprising in combination first means generating a plurality of time phased pulses, second means separating said pulses into a conical array of pulses.

19. An apparatus according to claim 18 further including, a plurality of mirrors equal in number to said pulses, each of said mirrors disposed to reflect one of said pulses to a single point such that said pulses arrive at said single point simultaneously as a single composite pulse.

* * * * *